June 19, 1951 P. B. DRANE ET AL 2,557,536
RELIEF VALVE
Filed Dec. 4, 1945 2 Sheets-Sheet 1
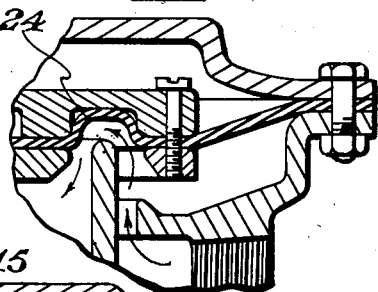
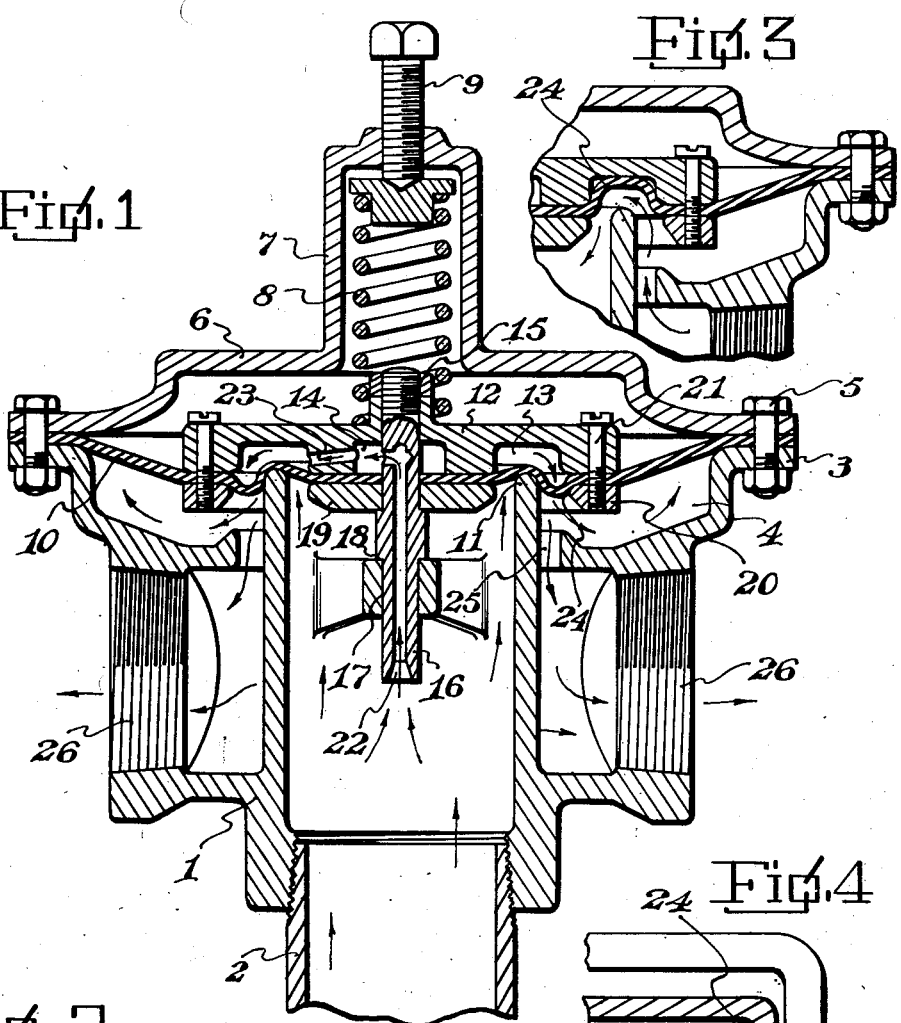
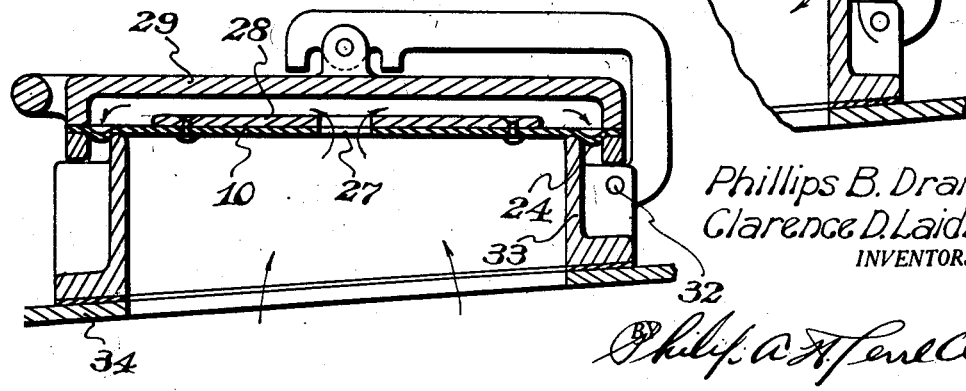
Phillips B. Drane
Clarence D. Laidley
INVENTORS
ATTORNEY.

June 19, 1951 P. B. DRANE ET AL 2,557,536
RELIEF VALVE
Filed Dec. 4, 1945 2 Sheets-Sheet 2

Phillips B. Drane
Clarence D. Laidley
INVENTORS

ATTORNEY.

Patented June 19, 1951

2,557,536

UNITED STATES PATENT OFFICE 2,557,536

RELIEF VALVE

Phillips B. Drane and Clarence D. Laidley,
Tulsa, Okla.

Application December 4, 1945, Serial No. 632,697

4 Claims. (Cl. 137—53)

The invention relates to pressure and vacuum relief valves for storage tanks, particularly for storing oil, and has for its object to provide a device of this kind wherein a flexible diaphragm is seated on the valve seat and is additionally held seated by pressure passing from below the diaphragm to a chamber above the diaphragm, thereby insuring a positive seating.

A further object is to provide sufficient flexibility and stretch to the diaphragm so it will overlie the seat and the sides of the seat when the diaphragm valve is seated thereby insuring a positive seating entirely around the valve seat. The additional flexibility and stretch of the diaphragm also forms means whereby the diaphragm will unseat and flex upwardly to relieve vacuum within the tank.

A further object is to provide means whereby the pressure, upon an unseating operation, is directed to a diversion chamber beneath the diaphragm adjacent its outer edges for assisting in the unseating operation.

A further object is to provide a stiffening plate above the diaphragm for acting against the regulating spring and the stiffening plate with a downwardly extending guide shaft having a port therethrough for allowing pressure to pass to the upper side of the diaphragm beneath the stiffening plate.

A further object is to provide a vacuum and pressure relief valve comprising a flexible diaphragm engaging the valve seat and maintained seated by normal pressure from below the diaphragm, and unseated upon excessive pressure, and at the same time being capable of unseating for relieving a vacuum below the diaphragm.

A further object is to provide a pressure and vacuum relief valve comprising a diaphragm carried by a hinged member and cooperating with a valve seat, and means for allowing passage of normal pressure from below the diaphragm to a position above the diaphragm within the hinged member.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical longitudinal sectional view through the relief valve.

Figure 2 is a vertical longitudinal sectional view through a modified form of relief valve.

Figure 3 is a detail sectional view through one side of the relief valve shown in Figure 1, and showing the parts in vacuum relief position.

Figure 4 is a detail sectional view through one side of the form shown in Figure 2, but showing the diaphragm flexed upwardly for the vacuum relief operation.

Figure 5:
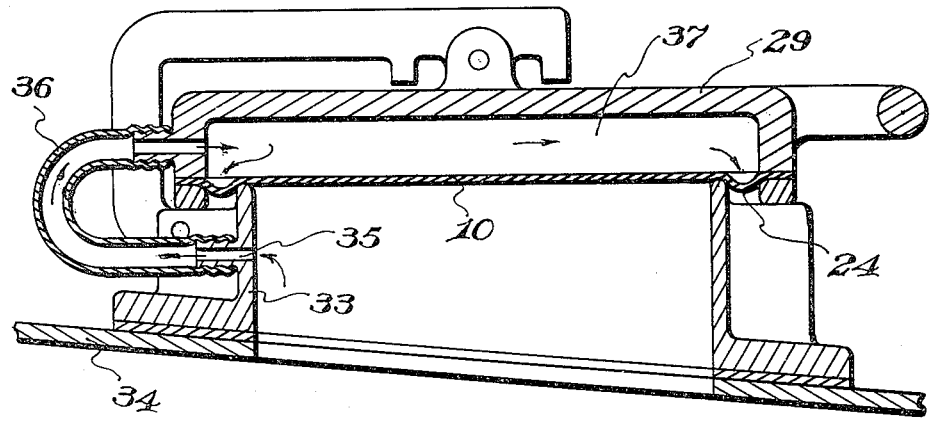
Figure 5 is a vertical longitudinal sectional view through a further modified form.

Referring to the drawings, the numeral 1 designates the relief valve casing which is attached to a pipe 2 leading from the storage tank. The upper end of the casing 1 terminates in an outwardly extending flange 3 and a diversion chamber 4, the purpose of which will be set forth.

Secured to the flange 3 by means of bolts 5 is a cover plate 6, having an upwardly extending chambered extension 7 which receives the expansion spring 8, the pressure of which spring is regulated by the adjusting bolt 9. Clamped between the cover plate 6 and the flange 3 is a flexible or resilient diaphragm 10, which diaphragm extends entirely across the diversion chamber 4, and this diaphragm cooperates with an annular valve seat 11. Mounted on the upper side of the diaphragm 10 is a stiffener plate 12 provided with an annular channel 13 and a central chamber 14, and threaded into the stiffener plate at 15 is a vertically disposed guide shaft 16, slidably mounted in a bearing of the spider 17, and said shaft 16 is provided with a shoulder 18 which engages the upper side of the spider and limits the downward movement of the diaphragm. Mounted on the vertical shaft 16 is a disc 19, and between the disc and stiffener plate 12 the diaphragm is clamped. Surrounding the valve seat 11, in spaced relation thereto, is a ring 20, clamped against the under side of the diaphragm by the bolts 21.

The spring pressure on the stiffener plate is regulated to maintain a predetermined gas pressure in the storage tank, and part of this pressure passes upwardly through the port 22 in the guide shaft 16 to the chamber 14 in the stiffener plate, and thence through port 23 to the annular channel 13, hence it will be seen that a downward pressure is applied to the upper side of the diaphragm around the valve seat 11 for positively seating the diaphragm, and at the same time annularly buckling the diaphragm downwardly, as at 24 and against the sides of the seat for insuring a large seating area. When an excessive amount of pressure builds up in the tank the diaphragm is unseated and a part of the pressure passes into the diversion chamber 4 and acts against the under side of the diaphragm around the margin thereof for further raising the diaphragm valve and the plate carried thereby against the action of the spring 8. The excess pressure is discharged through ports 25, and thence through outlets 26 to the atmosphere or any place desired, for instance a burner, where the pressure is gas.

When a vacuum forms in the tank, air is drawn inwardly through the discharge opening 26 and ports 25, however upon the in-breathing, caused by the vacuum, the portions 24 of the diaphragm valve move upwardly incident to the passage of the air between the diaphragm and the seat 11, and the portion 24 assumes the position shown in Figure 3 until the vacuum is relieved, and at which time the diaphragm will reseat, as shown in Figure 1. The diaphragm has enough pliability and slack therein to obtain the above result.

Referring to Figures 2 and 4, the diaphragm 10 is provided with a central opening 27 and an apertured stiffener plate 28, and the diaphragm is carried by a hinged cover plate 29, hingedly connected at 30 to arms 31, which arms in turn are hinged at 32 to a hatch flange 33, carried by the top of a storage tank 34. The operation of valve seating is the same as in Figure 1, that is the annular bulge 24 is additionally held by pressure above the diaphragm for additional seating on the valve seat 11. In Figure 4 the bulge is upwardly disposed while relieving a vacuum within the tank.

Referring to Figure 5, the tank flange 33 is provided with a pressure discharge port 35 below the diaphragm 10, and the pressure passes through a flexible tube 36 to the chamber 37 of the cover plate 29 above the diaphragm. In this form it will be noted that the pressure is by-passed around the side of the diaphragm. The diaphragm bulge 24 acts in the same way as in the previous forms mentioned, and the flexible tube 36 allows the hatch cover to be opened or closed. In Figures 2 and 5, however, the weight of the hatch cover is sufficient to maintain a safe pressure within the storage tank.

From the above it will be seen that a combined pressure and vacuum relief valve is provided, of the diaphragm type, which is simple in construction, and one wherein the diaphragm directly contacts the valve seat over a large area, and is also flexed upwardly for relieving a vacuum within the tank, thereby preventing damage to the tank, incident to excessive pressures or vacuum.

The invention having been set forth what is claimed as new and useful is:

1. A vacuum and pressure relief valve comprising a casing having a diaphragm chamber therein, a diaphragm within said chamber, a valve seat below the diaphragm and with which the diaphragm cooperates, a stiffener plate secured to the upper side of the diaphragm, the under side of said stiffener plate having an annular channel in registry with but wider than the seat thereby forming annular walls to the inside and outside of the seat and into which the diaphragm can flex upon the pulling of a vacuum, a pressure regulating spring cooperating with the upper side of the stiffener plate and normally urging the diaphragm towards the valve seat, a guide shaft carried by the stiffener plate and extending through the valve seat, said guide shaft having a pressure port extending therethrough and discharging into the annular channel in the under side of the stiffener plate for applying additional pressure to the upper side of the diaphragm for flexing the diaphragm downwardly over the outer side of the valve seat.

2. A device as set forth in claim 1 including a clamping ring of greater diameter than the valve seat and clamping the diaphragm and stiffener plate together.

3. A device as set forth in claim 1 wherein the lower portion of the casing forms a diverging chamber around the valve seat and below the diaphragm and forming means whereby additional pressure will be applied to the diaphragm under side upon excessive pressure upon initial unseating of the diaphragm from the seat, and means for discharging pressure from the casing from the diversion chamber.

4. A device as set forth in claim 1 wherein the under side of the stiffener plate is provided with a central chamber above the diaphragm, said central chamber being in communication with the port through the guide stem and the annular chamber in the under side of the stiffener plate.

PHILLIPS B. DRANE.
CLARENCE D. LAIDLEY.

REFERENCES CITED

The following references are of record in the file of this patent:

UNITED STATES PATENTS

| Number | Name | Date |
|---|---|---|
| 171,514 | Hyde | Dec. 28, 1875 |
| 313,080 | Kaiser | Mar. 3, 1885 |
| 1,988,026 | Unger | Jan. 15, 1935 |
| 2,213,181 | Von Wangenheim | Apr. 27, 1940 |
| 2,317,923 | Lebo | Apr. 27, 1943 |